Patented Nov. 20, 1923.

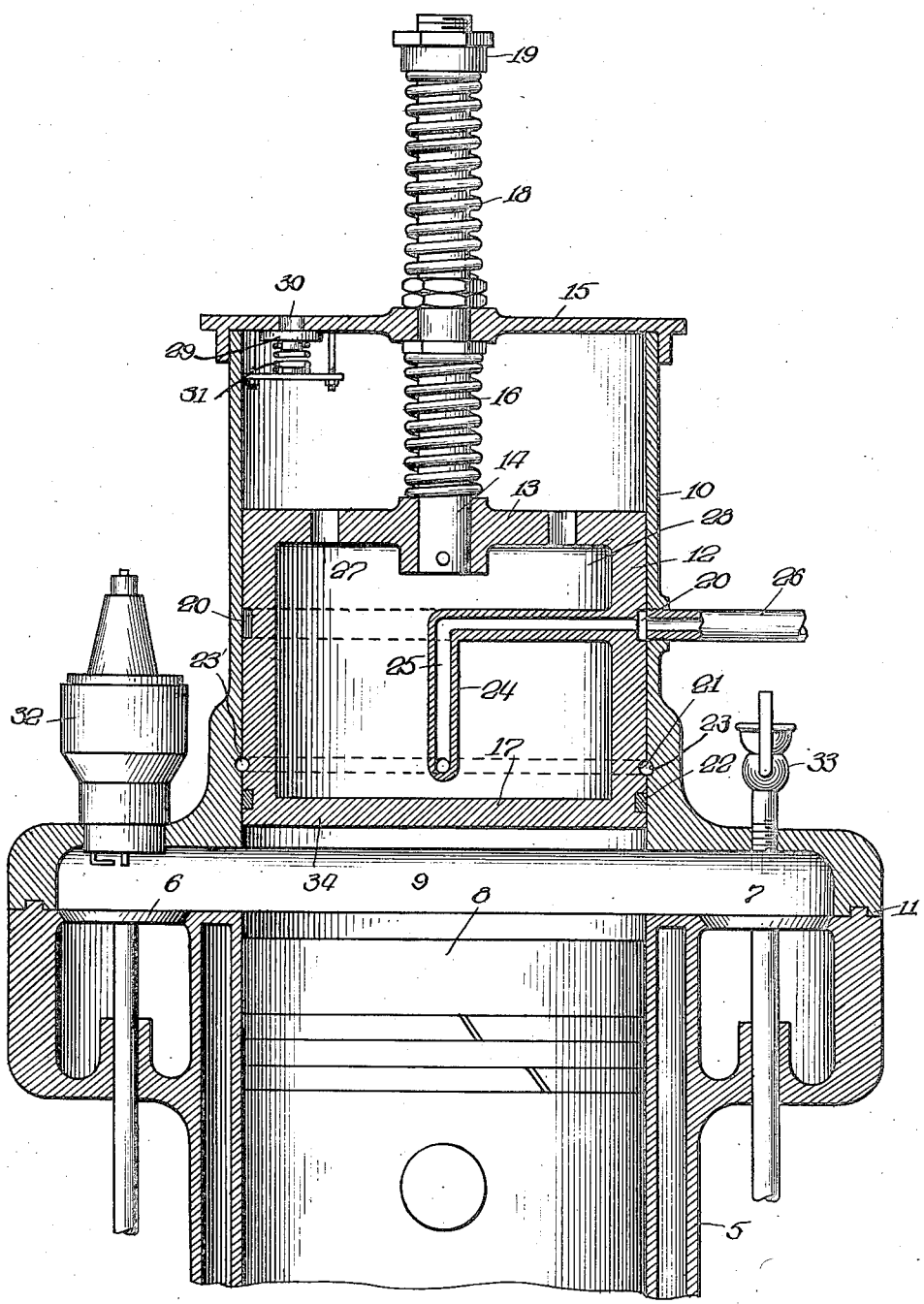

1,474,954

UNITED STATES PATENT OFFICE.

THOMAS E. BROWN, OF CHICAGO, ILLINOIS.

INTERNAL-COMBUSTION OR GAS ENGINE.

Application filed August 13, 1920. Serial No. 403,234.

*To all whom it may concern:*

Be it known that I, THOMAS E. BROWN, a citizen of the United States, residing at Chicago, in the county of Cook and State of Illinois, have invented certain new and useful Improvements in Internal-Combustion or Gas Engines, of which the following is a specification.

The invention relates to improvements in internal combustion or gas engines.

One of the objects of the invention is to increase the time duration of the power strokes of the engine and thereby enhance its efficiency.

Another object is to prolong the expansion effect of the explosion in its application to the receding piston.

Another object is to reduce the impact and to extend the time of expansion of an exploded charge.

Another object is to generate charges of the steam, within the cylinder, and utilize the expansive effect thereof subsequently to the time of impact produced by the explosion and in conjunction therewith.

Another object is to absorb a portion of the waste heat of an immediately preceding explosion to generate the steam before the heat is taken up, or absorbed, by the metal structure to be carried away by the medium used to cool the cylinder.

Another object is to introduce water into the combustion chamber, uniformly near the cylinder wall, and immediately after and by the effect of explosions of the re-occurring charges of fuel.

Another object is to compress a resilient medium, such as air, springs, or the like, or both, by effect of the peak of the explosion, the expansion of which prolongs the time of application of power during the power stroke of the engine.

Another object of the invention is to provide an engine having a piston adapted to be moved by the effect of the explosion to compress air in an auxiliary cylinder, the expansion of the air subsequently operating to prolong the power stroke by the power applied to the active primary piston.

Other, further and more specific objects of the invention will become readily apparent, to persons skilled in the art, from a consideration of the following description, when taken in conjunction with the drawing, in which there is shown a cylinder 5 of the ordinary standard type, having an intake valve 6 and an exhaust valve 7. A piston 8 reciprocates in the cylinder and moves practically to the upper limit shown in the drawing. A combustion chamber 9 is located immediately above the piston 8 and extends to the valves 6 and 7.

An auxiliary or supplementary cylinder 10 is secured to the upper edge of the standard cylinder 5, as at 11, and contains therein a supplementary or floating piston 12. To the end 13, of the piston 12, is secured a piston rod 14 which passes freely thru a cylinder head 15, the latter being secured to the upper end of the auxiliary cylinder 10. A resilient compressible element, in the nature of a spring 16, is contained between the head 13 of the piston 12 and the head 15 of the cylinder 10. The spring 16 is to be compressed by the force of the explosion acting upon the end 17 of the piston 12, in a manner hereinafter more fully explained. Another spring 18, surrounds the upper end of the piston rod 14, and is a means by which the piston 12 is positioned in the cylinder 10. An adjustable nut 19, upon the rod 14, determines the location of the lower edge of the piston 12 within its cylinder. The auxiliary piston 12 is provided with a circumferential groove 20 and another groove 21 near the lower part of the piston and above the piston ring 22. The groove 21 is made partly in the piston 12 and partly in the cylinder 10, as at 23. The grooves 20 and 21 are connected together by a conduit structure 24 having an opening 25 for the purpose. A pipe 26 for admitting water, or other suitable liquid, communicates with the groove 20. The upper wall 13 of the piston 12 contains openings 27 thru which air may enter into the chamber 28 within the auxiliary piston. A check valve 29 normally closes an opening 30 by means of the spring 31. When the piston 12 is raised in its cylinder 10 the check valve 29 is closed. When it moves in the opposite direction, and when the pressure within the cylinder 10 and the piston 12 is attenuated or below normal the check valve will open to admit a fresh supply of air.

A spark plug 32 is located above the intake valve 6, where a rich mixture of the charge is always present and a priming valve 33 may be located at any point above the combustion chamber, and in this instance it is shown above the exhaust valve 7.

The operation of the device is substantially as follows:—

When the piston 8 is moved inwardly of the cylinder the compression within the combustion chamber 9 is not sufficient to raise the piston 12 materially above the position shown in the drawing against the resistance of the spring 16 but, when the explosion takes place the piston 12 is driven inwardly of the cylinder 10 against the resistance offered by the spring 16 and the resilient effect of the air contained within the cylinder and within the chamber 28 of the piston 12, thereby compressing air and the spring by the expansive impact caused by the explosion. The lower edge 34 of the piston will be raised above the groove 23—the groove at this time being filled with water—so that the water contained in the groove 23 will thereby be free to be moved into the combustion chamber. The water is evenly distributed in the groove 23 and when it falls into the combustion chamber it is near the inner surface of the wall of the cylinder 5, ready to take up the heat that would otherwise be imparted to this wall and for this reason it maintains the inner wall of the cylinder 5 relatively cool. Immediately after the water falls into the combustion chamber, just subsequent to the prior explosion, it is instantly converted into steam by the excessive heat due to the explosion. The steam will expand and at the same time the spring 16 and the air under pressure, within the chamber 28 of the piston 12 and in the cylinder above the piston, will expand, thereby causing the piston 10 to move downwardly and thus maintaining the pressure in the combustion chamber 9, thereby prolonging the effect of the power on the piston 8 and causing an application of power to the piston 8 for a longer space of time during the power stroke. The spring 18 will permit the piston 12 to move downwardly to the position where the grooves 21 23 will come opposite and they will be again filled with water thru the conduit 25, the piston acting as a valve. The large body of air within the chamber 28 of the piston 12 and immediately above the piston in the cylinder 10, permits a rather extended movement of the piston 12, providing considerable flexibility in its operation.

One of the material advantages of my invention is the manner in which the water is introduced into the combustion chamber. The full force and effect of the exploding fuel charge has been attained before the water is introduced and the introduction of the water immediately following the charge does not decrease the power of the charge but utilizes the waste heat that otherwise must be carried away by the circulating water used for cooling the cylinder. This causes conversion of the water, thus introduced, into steam that produces the same effect upon the power piston as steam in an ordinary steam engine, thereby supplementing the effect of the abrupt explosion with the prolonged expansion of a medium well adapted for this purpose.

While I have herein shown a single exemplification of my invention and the means by which it may be carried into effect, I desire it to be distinctly understood that I do not consider my invention to be limited by this specific showing, as great variation may be made in the configuration and disposition of the parts within the scope of the appended claim.

Having described my invention what I claim as new and desire to secure by Letters Patent is:—

An internal combustion engine having a main cylinder and a supplementary cylinder of substantially the same diameter and arranged in axial alignment; a laterally extending combustion chamber between the two cylinders; valves closing ports in the walls of the lateral part of the casing surrounding the combustion chamber; a working piston in the main cylinder; a floating piston in the supplementary cylinder; a piston rod connected to the floating piston and passing thru the head of said cylinder; a compression spring about the rod, on each side of said head to resist movement of said floating piston in either direction; means to adjust the tension of said springs and a valve to admit water into said combustion space after the floating piston has been moved by the force of the explosion approximately the limit of its outer movement.

In testimony whereof I hereunto subscribed my name.

THOMAS E. BROWN.